US009817349B2

(12) United States Patent
Tokashiki et al.

(10) Patent No.: US 9,817,349 B2
(45) Date of Patent: Nov. 14, 2017

(54) PRINTING SYSTEM, METHOD FOR CONTROLLING THE PRINTING SYSTEM, AND COMPUTER-READABLE STORAGE MEDIUM

(75) Inventors: Kiyoshi Tokashiki, Yokohama (JP); Kazuhiko Ushiyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 120 days.

(21) Appl. No.: 12/772,078

(22) Filed: Apr. 30, 2010

(65) Prior Publication Data

US 2010/0315657 A1 Dec. 16, 2010

(30) Foreign Application Priority Data

Jun. 16, 2009 (JP) ................................ 2009-143131

(51) Int. Cl.
*G06K 15/10* (2006.01)
*G03G 15/00* (2006.01)

(52) U.S. Cl.
CPC ......... *G03G 15/50* (2013.01); *G03G 15/6538* (2013.01)

(58) Field of Classification Search
None
See application file for complete search history.

(56) References Cited

U.S. PATENT DOCUMENTS 4,687,191 A 8/1987 Stemmle
4,801,133 A 1/1989 Ishiguro et al.
5,161,037 A * 11/1992 Saito ............................ 358/468
5,832,358 A * 11/1998 Sampath et al. .............. 399/405
5,987,300 A * 11/1999 Mori ............................ 399/401
6,010,127 A * 1/2000 DiCesare et al. ............ 271/259
6,104,496 A 8/2000 Minowa
6,850,719 B2 2/2005 Nagaya
7,281,707 B2 10/2007 Moriyama
2002/0023071 A1 2/2002 Takahashi
2003/0050978 A1 3/2003 Cannon
2004/0190057 A1 9/2004 Takahashi
2006/0214347 A1* 9/2006 Iizuka et al. ............... 270/58.14
2007/0127063 A1* 6/2007 Fertlitsch ............. G06F 3/1203 358/1.15

(Continued)

FOREIGN PATENT DOCUMENTS

CN 1837002 A 9/2006
EP 1293841 A2 3/2003

(Continued)

OTHER PUBLICATIONS

U.S. Appl. No. 12/772,095, filed Apr. 30, 2010, Junichi Mori.

*Primary Examiner* — John Wallace
(74) *Attorney, Agent, or Firm* — Canon USA, Inc. I.P. Division

(57) ABSTRACT

A control method for controlling a printing system includes selectively executing an inline job and an offline job. The inline job is for executing post-processing on a sheet printed by a printing apparatus by using a post-processing apparatus and the offline job is for executing post-processing on a sheet without executing printing by the printing apparatus by using the post-processing apparatus. The control method also includes restricting execution of the inline job if a sheet has been set in a paper feed unit that is a paper feed source of the offline job to be executed.

8 Claims, 11 Drawing Sheets

(56) References Cited

U.S. PATENT DOCUMENTS

| | | | | |
|---|---|---|---|---|
| 2007/0127065 | A1* | 6/2007 | Nishizawa | 358/1.15 |
| 2007/0171454 | A1* | 7/2007 | Takahashi et al. | 358/1.14 |
| 2007/0171455 | A1* | 7/2007 | Tominaga | 358/1.14 |
| 2007/0279646 | A1 | 12/2007 | Sugimoto et al. | |
| 2008/0024807 | A1 | 1/2008 | Matsuda | |
| 2009/0087242 | A1* | 4/2009 | Sato | 399/407 |
| 2009/0141301 | A1* | 6/2009 | Cornelissen et al. | 358/1.14 |

FOREIGN PATENT DOCUMENTS

| | | | |
|---|---|---|---|
| JP | 61-111260 | A | 5/1986 |
| JP | S63-139873 | A | 6/1988 |
| JP | 08-002801 | A | 1/1996 |
| JP | 9-044051 | A | 2/1997 |
| JP | 11-292376 | A | 10/1999 |
| JP | 2004-045963 | A | 2/2004 |
| JP | 2004-205571 | A | 7/2004 |
| JP | 2005-031306 | A | 2/2005 |
| JP | 2005-341145 | A | 12/2005 |
| JP | 2006-208475 | A | 8/2006 |
| JP | 2006-254162 | A | 9/2006 |
| JP | 2006-305760 | A | 11/2006 |
| JP | 2008-234543 | A | 10/2008 |
| JP | 2009-091065 | A | 4/2009 |

* cited by examiner

PRINTING SYSTEM, METHOD FOR CONTROLLING THE PRINTING SYSTEM, AND COMPUTER-READABLE STORAGE MEDIUM

BACKGROUND OF THE INVENTION

Field of the Invention

The present invention relates to a printing system, a method for controlling the printing system, and a computer-readable storage medium.

Description of the Related Art

U.S. Patent Application Publication No. 2004/0190057 discusses a print on demand (POD) printing system that utilizes an electrophotographic type printing apparatus or an inkjet type printing apparatus. By utilizing the POD printing system, it becomes unnecessary to prepare a block copy or execute complicated operations.

In the POD printing system, however, post-processing by a post-processing apparatus (e.g., an inline finisher), by which a sheet can be fed from a printing apparatus and conveyed via a conveyance path, cannot be utilized independently from printing by the printing apparatus. Accordingly, the POD printing system cannot solve further problems to be solved, which may arise when post-processing by an inline finisher is available independently from printing by a printing apparatus provided in the POD printing system.

Now, the further problems of the POD system will be described. Hereinbelow, a job for executing post-processing by a post-processing apparatus after printing by a printing apparatus is defined as an "inline job", while a job for executing post-processing by a post-processing apparatus without executing printing by a printing apparatus is defined as an "offline job".

In executing an offline job, a user sets sheets to be processed in the offline job on an inserter of a post-processing apparatus. In this case, if the printing apparatus executes an inline job before executing the offline job, the sheets set by the user on the inserter for the offline job may be used for the inline job.

SUMMARY OF THE INVENTION

According to an aspect of the present invention, a printing system includes a job execution unit configured to selectively execute an inline job and an offline job. The inline job is for executing post-processing on a sheet printed by a printing apparatus by using a post-processing apparatus and the offline job is for executing post-processing on a sheet without executing printing by the printing apparatus by using the post-processing apparatus. The printing system further includes a control unit configured to restrict execution of the inline job if a sheet has been set in a paper feed unit that is a paper feed source of the offline job to be executed by the job execution unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

DESCRIPTION OF THE EMBODIMENTS

Various exemplary embodiments, features, and aspects of the invention will be described in detail below with reference to the drawings.

Figure 1:
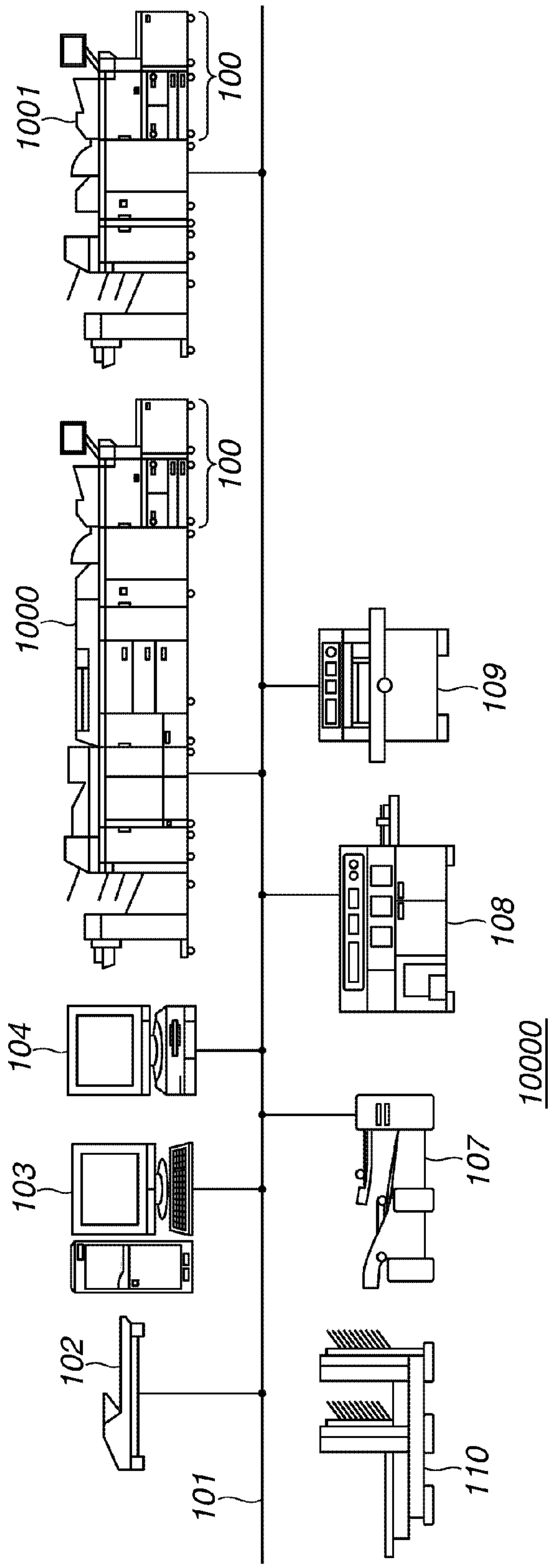
FIG. 1 illustrates an exemplary configuration of the entire printing environment including a printing system according to an exemplary embodiment of the present invention.

FIG. 1 illustrates an exemplary configuration of the entire printing environment 10000, which includes printing systems 1000 and 1001, according to a first exemplary embodiment of the present invention.

Referring to FIG. 1, the printing environment 10000 includes the printing systems 1000 and 1001, a personal computer (PC) (server computer) 103, and a client computer (PC) 104. In addition, the printing environment 10000 includes a paper folding machine 107, a cutting machine 109, a saddle stitch binding machine 110, a case binding machine 108, and a network scanner 102. The above-described component devices of the printing environment 10000 except the saddle stitch binding machine 110 are in communication with one another via a network 101.

Figure 2:
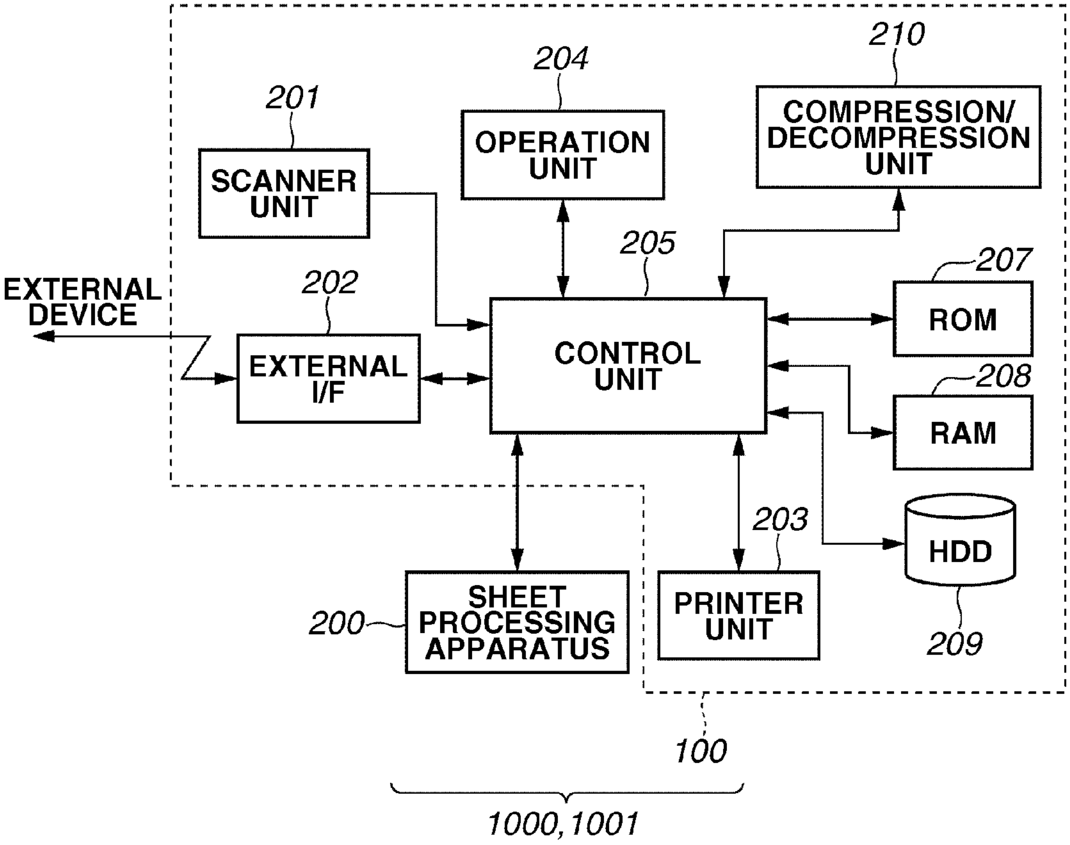
FIG. 2 is a block diagram illustrating an exemplary configuration of the printing system illustrated in FIG. 1.

Each of the printing systems 1000 and 1001 includes a printing apparatus 100 and a sheet processing apparatus 200 (see FIG. 2). In the present exemplary embodiment, a multifunction peripheral (MFP) having a plurality of functions, such as a copy function and a printer function, will be described as an example of the printing apparatus 100. The printing apparatus 100 can be a single function peripheral (SFP) type printing apparatus including a copy function only or a printer function only.

The server PC 103 manages sending and receiving of data among various apparatuses in communication with one another via the network 101. The client PC 104 sends image data to the printing apparatus 100 or to the server PC 103 via the network 101. The paper folding machine 107 folds paper sheets printed with the printing apparatus 100. The case binding machine 108 performs case binding processing of sheets printed with the printing apparatus 100. The cutting machine 109 cuts a stack of sheets printed with the printing apparatus 100. The saddle stitch binding machine 110 performs saddle stitch binding processing on sheets printed with the printing apparatus 100.

In utilizing the paper folding machine 107, the case binding machine 108, the cutting machine 109, and the saddle stitch binding machine 110, a user (operator) takes out sheets printed with the printing apparatus 100 from the printing system 1000 or 1001 and then sets the printed sheets into the machine that the user desires to use to perform desired processing. In the present exemplary embodiment, the printing system 1001 has the same configuration as that of the printing system 1000. However, the present exemplary embodiment is not limited to this.

An exemplary configuration of each of the printing systems 1000 and 1001 will now be described below with reference to a system block diagram illustrated in FIG. 2. FIG. 2 is a block diagram illustrating an exemplary configuration of each of the printing systems 1000 and 1001 illustrated in FIG. 1.

A unit may be viewed as an assemblage of components that is regarded as a single entity. Other than the sheet processing apparatus 200, units included in the printing systems 1000 and 1001 illustrated in FIG. 2 are included in the printing apparatus 100. An arbitrary number of sheet processing apparatuses 200 can be connected to the printing apparatus 100.

The printing system 1000 and 1001 can perform sheet processing ("sheet processing" will hereafter be also referred to as "post-processing") of sheets printed with the printing apparatus 100, via the sheet processing apparatus 200, which is connected to the printing apparatus 100.

The sheet processing apparatus 200 can communicate with the printing apparatus 100. The sheet processing apparatus 200 receives an instruction from the printing apparatus 100 to perform sheet processing to be described below.

A scanner unit 201 reads an image of an original document, converts the read document image into image data, and transfers the converted image data to another unit. An external interface (I/F) unit 202 sends and receives data to and from another apparatus that is in communication with the external I/F unit 202 via the network 101.

A printer unit 203 prints an image on a sheet based on input image data. An operation unit 204 includes a key input portion 4002 (FIG. 7) and a touch panel portion 4001 (FIG. 7) and receives an instruction from the user via the key input portion 4002 and the touch panel portion 4001. The operation unit 204 provides various displays on the touch panel portion 4001.

A control unit 205 controls processing and operations of the various units included in the printing systems 1000 and 1001. That is, the control unit 205 controls the operations of the printing apparatus 100 and the sheet processing apparatus 200 connected to the printing apparatus 100.

A read-only memory (ROM) 207 stores various computer programs to be executed by the control unit 205. For example, the ROM 207 stores a program used for executing various processing illustrated in flow charts to be described below by the control unit 205 and a display control program used for displaying various setting screens to be described below.

In addition, the ROM 207 stores a program used for allowing the control unit 205 to interpret page description language (PDL) code data received from the server PC 103 or the client PC 104 and to rasterize the interpreted data into raster image data. Furthermore, the ROM 207 stores various programs, such as a boot sequence, and font information.

A random access memory (RAM) 208 stores image data sent from the scanner unit 201 or the external I/F unit 202 and various programs and setting information stored in the ROM 207. Furthermore, the RAM 208 stores information related to the sheet processing apparatus 200 (information on the number of sheet processing apparatuses 200 connected to the printing apparatus 100 (from 0 to n), information on functions of each of the sheet processing apparatuses 200, and information on a connection order of the sheet processing apparatuses 200).

A hard disk drive (HDD) 209 includes a hard disk and a drive unit used for reading and writing data from and onto the hard disk. The HDD 209 is a large-capacity storage device storing image data input from the scanner unit 201 or the external I/F unit 202 and compressed by a compression/decompression unit 210.

The control unit 205 can perform printing of the image data stored in the HDD 209 with the printer unit 203 according to an instruction from the user. Moreover, the control unit 205 can send image data stored in the HDD 209 to an external apparatus, such as the server PC 103, the printing system 1000, or the printing system 1001, via the external I/F unit 202 according to an instruction from the user.

In addition, the control unit 205 can receive image data from an external apparatus, such as the server PC 103, the printing system 1000, or the printing system 1001, via the external I/F unit 202. Furthermore, the control unit 205 can search for an external apparatus connected to the network 101 via the external I/F unit 202.

The compression/decompression unit 210 performs an operation for compressing and decompressing image data stored in the RAM 208 or the HDD 209 according to various compression systems, such as Joint Bi-level Image Experts Group (JBIG) and Joint Photographic Experts Group (JPEG).

Figure 3:
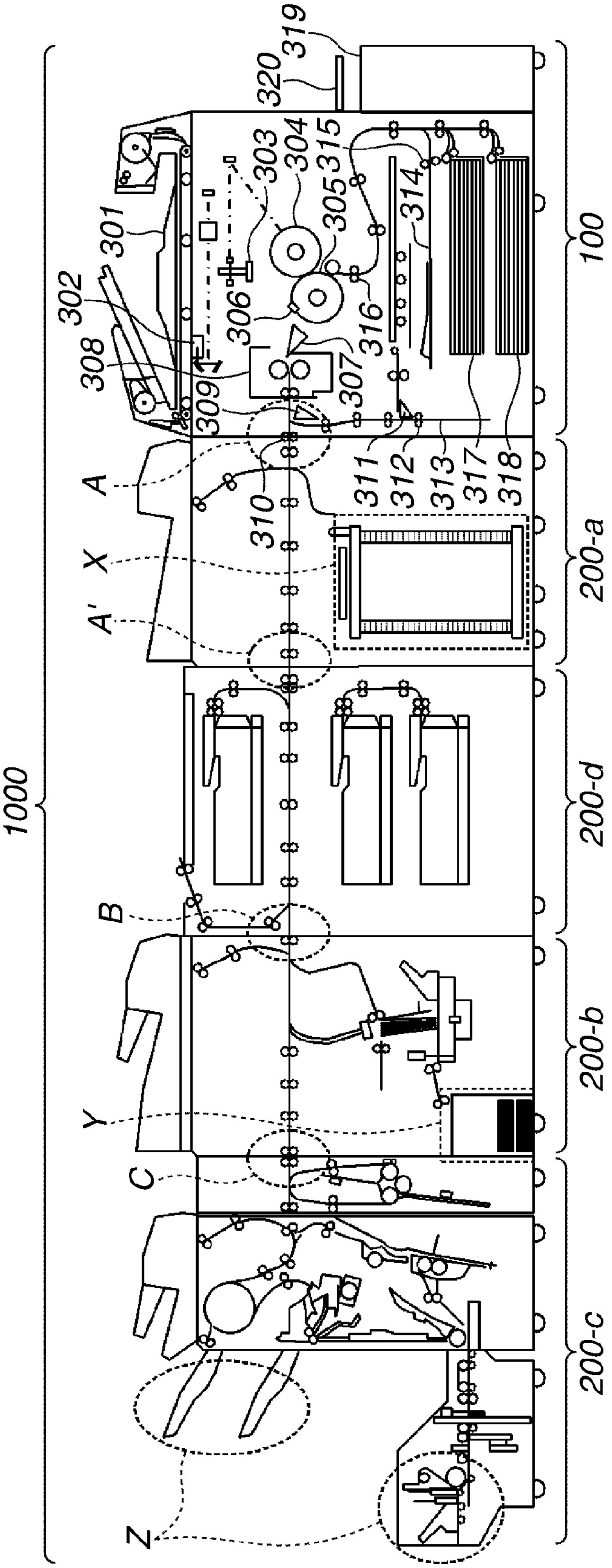
FIG. 3 is a cross section illustrating an exemplary configuration of a sheet processing apparatus, which is connected to the printing apparatus.

An exemplary configuration of the printing system 1000 will now be described with reference to FIG. 3. FIG. 3 is a cross section of the printing apparatus 100 (FIG. 1) and the sheet processing apparatus 200 (FIG. 2), which is connected to the printing apparatus 100.

Referring to FIG. 3, an auto document conveyance apparatus (auto document feeder (ADF)) 301 separates a document placed on top of a document bundle set on a stacking surface of a document tray in a stacking order and conveys the separated document onto a document positioning glass to scan the document with a scanner 302.

The scanner 302 reads an image on the document conveyed onto the document positioning glass and converts the read image into image data with a charge-coupled device (CCD). A ray, such as a laser beam, modulated according to image data is made incident on a rotating polygonal mirror 303. The ray reflected from the polygonal mirror 303 falls on the surface of a photosensitive drum 304 via a reflection mirror as reflection scanning light.

A latent image formed on the surface of the photosensitive drum 304 with the laser beam is developed with a toner. A toner image is transferred onto a sheet attached onto the surface of a transfer drum 305. By serially performing a series of image-forming processes on toners of colors of yellow (Y), magenta (M), cyan (C), and black (K), a full color image is formed. After performing four image-forming processes, a sheet on the transfer drum 305, onto which a full color image has been formed, is separated by a separation claw 306. The separated sheet is conveyed to a fixing device 308 by a pre-fixing conveyance device 307.

The fixing device 308 includes rollers and a belt in combination with one another. The fixing device 308 includes therein a heat source, such as a halogen heater, and resolves and fixes the toner on the sheet, onto which the toner image has been transferred, with heat and pressure. A paper discharge flapper 309 can swing around a swinging axis and regulates the direction of conveying a sheet.

When the paper discharge flapper 309 swings clockwise in FIG. 3, a sheet is conveyed in a straight direction and then is discharged to the outside of the printing apparatus 100 by a discharge roller 310. With a series of processes described above, the control unit 205 controls the printing apparatus 100 so that the printing apparatus 100 performs one-sided printing.

In forming images on both sides of a sheet, the paper discharge flapper 309 swings counterclockwise in FIG. 3. The conveyance direction of the sheet is changed to a downward direction to convey the sheet to a two-sided conveyance unit. The two-sided conveyance unit includes a reversal flapper 311, a reversal roller 312, a reversal guide 313, and a two-sided tray 314.

The reversal flapper 311 swings around a swinging axis and regulates the direction of conveying a sheet. In performing a two-sided print job, the control unit 205 performs control so that the reversal flapper 311 swings counterclockwise in FIG. 3 to convey a sheet, whose first side is already printed with the printer unit 203, into the reversal guide 313 via the reversal roller 312. The control unit 205 temporarily stops the reversal roller 312 in the state where a trailing edge of the sheet is pinched by the reversal roller 312, and then allows the reversal flapper 311 to swing clockwise in FIG. 3. Further, the control unit 205 allows the reversal roller 312 to rotate in a reverse direction.

Thus, the sheet is switched back to be conveyed. The control unit 205 performs control to guide the sheet to the two-sided tray 314 in the state where the leading edge and the trailing edge of the sheet have been changed in position. The sheet is temporarily stacked on the two-sided tray 314. The sheet is then conveyed to a registration roller 316 by a refeed roller 315.

At this time, the sheet is fed with a side thereof opposite to the first side used in the transfer processing facing the photosensitive drum 304. Then, the control unit 205 performs control to form an image on the second side of the sheet as in the processing described above. Thus, images are formed on both sides of the sheet. After fixing processing is completed, the sheet is discharged to the outside of the printing apparatus 100 via the discharge roller 310.

By serially performing the processes described above, the control unit 205 controls the printing apparatus 100 to perform two-sided printing.

In addition, the printing apparatus 100 includes a paper feed unit for storing sheets used for print processing. The paper feed unit includes paper feed cassettes 317 and 318, each of which can store, for example, five hundred sheets, a paper feed deck 319, which can store, for example, five thousand sheets, and a manual feed tray 320.

Various sheets of different sizes and materials can be respectively set in the paper feed cassettes 317 and 318 and the paper feed deck 319. In the manual feed tray 320, various types of sheets including a special sheet, such as an overhead projector (OHP) sheet, can be set. Each of the paper feed cassettes 317 and 318, the paper feed deck 319, and the manual feed tray 320 includes a paper feed roller. Sheets can be serially fed one by one by the paper feed roller.

The sheet processing apparatus 200 illustrated in FIG. 3 will now be described.

An arbitrary number of different types of sheet processing apparatuses 200 in the printing systems 1000 according to the present exemplary embodiment can be connected in tandem as long as sheets can be conveyed from the sheet processing apparatus 200 on the upstream side to the sheet processing apparatus 200 on the downstream side via a sheet conveyance path. For example, as illustrated in FIG. 3, the sheet processing apparatuses 200 can include a large-capacity stacker 200-*a*, an inserter 200-*d*, a gluing bookbinding machine 200-*b*, and a saddle stitch binding machine 200-*c* in this order from the printing apparatus 100. The large-capacity stacker 200-*a*, the inserter 200-*d*, the gluing bookbinding machine 200-*b*, and the saddle stitch binding machine 200-*c* can be selectively used in the printing system 1000.

Each of the sheet processing apparatuses 200 includes a sheet discharge unit. The user can take out the sheet that has been subjected to sheet processing from the sheet discharge unit of each of the sheet processing apparatuses 200.

The control unit 205 receives a request for performing sheet processing desired by the user of a plurality of types of sheet processing options that can be performed by the sheet processing apparatus 200 connected to the printing apparatus 100, together with a request for performing printing, via the operation unit 204. When the control unit 205 receives the request for performing printing of a job to be processed from the user via the operation unit 204, the control unit 205 performs the print processing requested for the job with the printer unit 203.

The control unit 205 allows the sheet on which the print processing has been performed to be conveyed to the sheet processing apparatus 200 that can perform the sheet processing desired by the user via the sheet conveyance path and to perform the sheet processing with the sheet processing apparatus 200.

For example, in the case of the printing system 1000 having the system configuration illustrated in FIG. 3, suppose that a job to be processed whose request for printing has been received from the user is a job that has been instructed to be subjected to large amount stacking processing with the large-capacity stacker 200-*a*. That job is herein referred to as a "stacker job".

If the stacker job is processed with the system configuration illustrated in FIG. 3, the control unit 205 allows the sheet in the job that has been printed with the printing apparatus 100 to pass a point A in FIG. 3 and to be conveyed into the large-capacity stacker 200-*a*. After that, the control unit 205 performs the stacking processing in the job with the large-capacity stacker 200-*a*.

Then, the control unit 205 allows the printed product of the job on which the stacking processing has been performed with the large-capacity stacker 200-*a* to be held in a paper discharge destination X in the large-capacity stacker 200-*a*, without conveying the printed product to another apparatus (for example, an apparatus in a later stage).

In addition, suppose that the job to be processed whose request for printing has been received from the user in the system configuration in FIG. 3 is a job that has been instructed to be subjected to sheet processing (for example, gluing bookbinding processing, such as case binding processing or top gluing binding) with the gluing bookbinding machine 200-*b*. That job is herein referred to as a "gluing bookbinding job".

In performing the gluing bookbinding job with the system configuration illustrated in FIG. 3, the control unit 205 allows a sheet printed with the printing apparatus 100 to be conveyed into the inside of the gluing bookbinding machine 200-*b* via points A and B in FIG. 3. After that, the control unit 205 performs gluing bookbinding processing of the job with the gluing bookbinding machine 200-*b*.

Then, the control unit 205 allows the printed product of the job on which the gluing bookbinding processing has been performed with the gluing bookbinding machine 200-*b* to be held in a paper discharge destination Y in the gluing bookbinding machine 200-*b*, without conveying the printed product to another apparatus (for example, an apparatus in a later stage).

Furthermore, for example, in the case of the system configuration illustrated in FIG. 3, suppose that a job to be processed whose request for printing has been received from the user is a job that has been instructed to be subjected to sheet processing with the saddle stitch binding machine 200-*c*. The sheet processing performed with the saddle stitch binding machine 200-*c* includes, for example, saddle stitch binding processing, punching processing, cutting processing, shift discharge processing, and folding processing. That job is herein referred to as a "saddle stitch binding job".

In processing the saddle stitch binding job with the system configuration in FIG. 3, the control unit 205 allows a sheet used in the job printed with the printing apparatus 100 to pass points A, A', B, and C in FIG. 3 to be conveyed to the saddle stitch binding machine 200-*c*. After that, the control unit 205 performs sheet processing of the job with the saddle stitch binding machine 200-*c*.

Then, the control unit 205 allows the printed product of the saddle stitch binding job that has been subjected to the sheet processing with the saddle stitch binding machine 200-*c* to be held in the paper discharge destination Z in the saddle stitch binding machine 200-*c*.

The paper discharge destination Z includes a plurality of paper discharge destination options. With the plurality of paper discharge destination options, the saddle stitch binding machine 200-*c* can perform a plurality of types of sheet processing. The plurality of paper discharge destination options is used for respective types of sheet processing.

Moreover, in the case of the system configuration illustrated in FIG. 3, suppose that a job to be processed whose request for printing has been received from the user is a job that has been instructed to be subjected to sheet processing with the inserter 200-*d*. That job is herein referred to as an "inserter paper feed job".

In processing an inserter paper feed job, another sheet processing apparatus 200 provided downstream of the sheet processing apparatus 200 and connected thereto can also be used. Now, processing to be executed when an inserter paper feed job is processed within the system having the configuration illustrated in FIG. 3 will be described in detail below.

The control unit 205 inserts a sheet fed from the inserter 200-*d* into the sheets of the job printed by the printing apparatus 100. In addition, the control unit 205 conveys the sheet to the sheet processing apparatus 200 according to the designated sheet processing to execute the sheet processing thereon.

In the example of the printing system 1000 illustrated in FIG. 3, the gluing bookbinding machine 200-*b* and the saddle stitch binding machine 200-*c* are provided downstream of the inserter 200-*d*. With this configuration, a gluing bookbinding job and a saddle stitch binding job can be executed within the printing system 1000.

In executing an inserter paper feed job, it is not always necessary to execute printing by the printing apparatus 100. More specifically, the sheet processing can be executed by conveying a sheet fed from the inserter 200-*d* to a downstream sheet processing apparatus 200, which has been designated by the user, to execute sheet processing thereon.

As described with reference to FIGS. 1 through 3, in the printing system 1000 according to the present exemplary embodiment, a plurality of sheet processing apparatuses 200 having mutually different functions can be connected to the printing apparatus 100. The plurality of sheet processing apparatuses 200 can be connected to the printing apparatus 100 in an arbitrary combination thereof.

Figure 4:
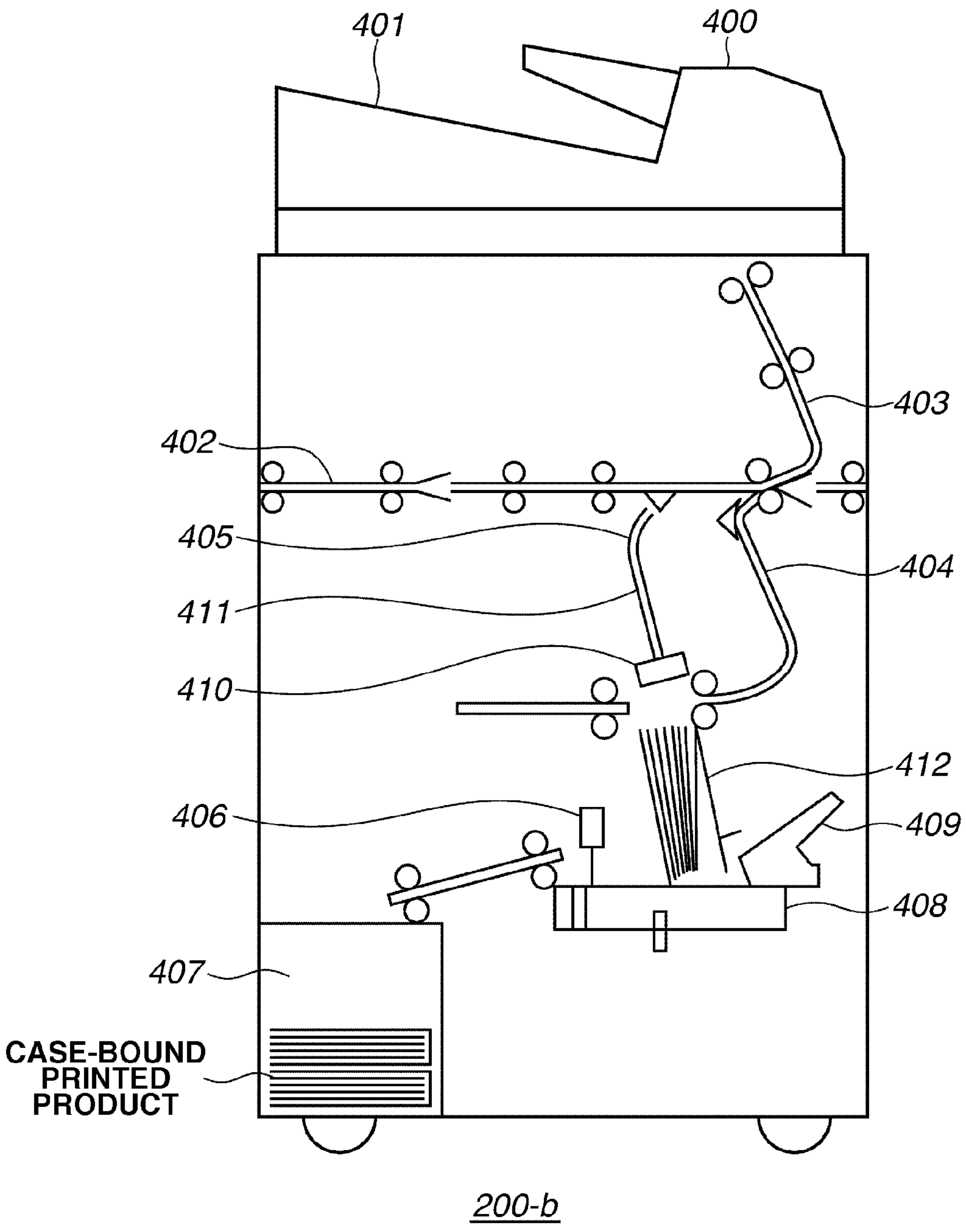
FIG. 4 is a cross section illustrating an exemplary configuration of a gluing bookbinding machine.

An exemplary inner configuration of each type of sheet processing apparatus 200, which can be connected to the printing apparatus 100, will be described in detail below with reference to each of FIGS. 4, 5, and 8. FIG. 4 is a cross section illustrating an exemplary configuration of the gluing bookbinding machine 200-*b* illustrated in FIG. 3.

The gluing bookbinding machine 200-*b* conveys a sheet conveyed from an upstream apparatus selectively into three conveyance paths. The conveyance paths include a cover path 404, a textblock path 405, and a straight path 402.

In addition, the gluing bookbinding machine 200-*b* includes an inserter path 403. The inserter path 403 of an inserter 400 is a sheet conveyance path used for conveying a sheet placed on an inserter tray 401 to the cover path 404.

The straight path 402 (FIG. 4) of the gluing bookbinding machine 200-*b* is a sheet conveyance path used for conveying a sheet used in a job that requires no gluing bookbinding processing with the gluing bookbinding machine 200-*b* to a later stage apparatus.

The textblock path 405 and the cover path 404 of the gluing bookbinding machine 200-*b* are sheet conveyance paths used for conveying a sheet necessary for generating a case-bound printed product.

For example, in generating a case-bound printed product using the gluing bookbinding machine 200-*b*, the control unit 205 prints image data for the text that is to be printed on a sheet for the text of the case-bound printed product with the printer unit 203. In generating one case-bound printed product, a sheet stack for one book including sheets for the text is wrapped with one cover sheet. The sheet stack for the text used in case binding is herein referred to as a "textblock". Hereinbelow, a "textblock" may also be referred to merely as a "text".

The control unit 205 performs control so that the sheets for the textblock printed with the printing apparatus 100 are conveyed to the textblock path 405 illustrated in FIG. 4.

The control unit 205, in performing case binding processing, performs processing for binding the textblock sheets printed with the printing apparatus 100 with the cover sheet conveyed via the cover path 404.

For example, the control unit 205 allows the textblock sheets conveyed from an upstream apparatus to be serially stacked in a stacking unit 411 via the textblock path 405. When the sheets onto which the text data is printed are stacked in the stacking unit 411 in an amount equivalent to the number of sheets for one book, the control unit 205 allows one sheet used for the cover required in the job to be conveyed via the cover path 404.

The control unit 205 (FIG. 2) controls a gluing unit 410 (FIG. 4) so that the gluing unit 410 performs gluing processing on a spine portion of one set of the sheet stack that is equivalent to the textblock. After that, the control unit 205 controls the gluing unit 410 so that the gluing unit 410 attaches the spine portion of the textblock to a central portion of the cover sheet. In attaching the textblock to the cover, the textblock is conveyed while being pressed into a lower portion of the gluing bookbinding machine 200-*b*.

Thus, the control unit 205 performs processing for folding the cover sheet to wrap the textblock with one cover sheet. Subsequently, one set of sheet stack is stacked on a turntable 408 (FIG. 4) along a guide 412 (FIG. 4).

After one set of sheet stack is set on the turntable 408, the control unit 205 performs processing for cutting the sheet stack with a cutter unit 406 (FIG. 4). In performing the cutting processing, three-side trimming processing, in which three sides except for the edge corresponding to the spine portion of one set of the sheet stack are cut, is performed with the cutter unit 406.

Subsequently, the control unit 205 presses the sheet stack that has been trimmed in three sides toward a basket 407 using a narrowing portion 409 to store the sheet stack in the basket 407.

The present exemplary embodiment generates a book by case binding in the above-described manner. In the present exemplary embodiment, the gluing bookbinding machine 200-*b* can selectively execute "top gluing binding" processing instead of case binding. More specifically, "top gluing binding" is processing for binding a sheet stack into a book without providing a cover as in case binding. To paraphrase this, in top gluing binding, a side edge of a textblock (text) is glued.

In executing the top gluing binding processing, the control unit 205 executes control for not using a sheet for a cover in the processing executed in the above-described case binding processing. More specifically, in this case, the control unit 205 executes control so that processing related to the cover is not executed. In this case, a sheet for the cover, which is utilized in the case binding mode, is not even fed from the paper feed unit in the top gluing binding processing.

Furthermore, the gluing bookbinding machine 200-*b* can not only process the sheet conveyed from an upstream apparatus but also execute case binding processing or top gluing binding processing on a sheet fed from the paper feed unit of the gluing bookbinding machine 200-*b* itself.

An operation for generating a case-bound printed product by one sheet processing apparatus 200 only will be described in detail below. More specifically, an operator sets a sheet to be processed on the inserter tray 401 (FIG. 4). Then, the control unit 205 executes control for feeding the sheet set on the inserter tray 401 by using the inserter 400 (FIG. 4). The sheet is used as a textblock.

Furthermore, the control unit 205 executes control for conveying the sheet used as the textblock into the textblock path 405 (FIG. 4). Furthermore, the control unit 205 executes control for conveying the cover sheet, which has been fed from the inserter tray 401, via the cover path 404. Moreover, the control unit 205 executes processing for case-binding the textblock sheets. The processing to be executed thereafter is as described above.

The gluing bookbinding machine 200-*b* includes a sensor for determining whether a sheet has been set on the inserter tray 401 of the inserter 400. The gluing bookbinding machine 200-*b* transmits a result of the determination of presence of a sheet by the sensor to the control unit 205 via a signal line (not illustrated). Accordingly, the control unit 205 can determine whether a sheet has been set on the inserter tray 401.

An exemplary inner configuration of the saddle stitch binding machine 200-*c* will now be described below with reference to FIG. 5.

Figure 5:
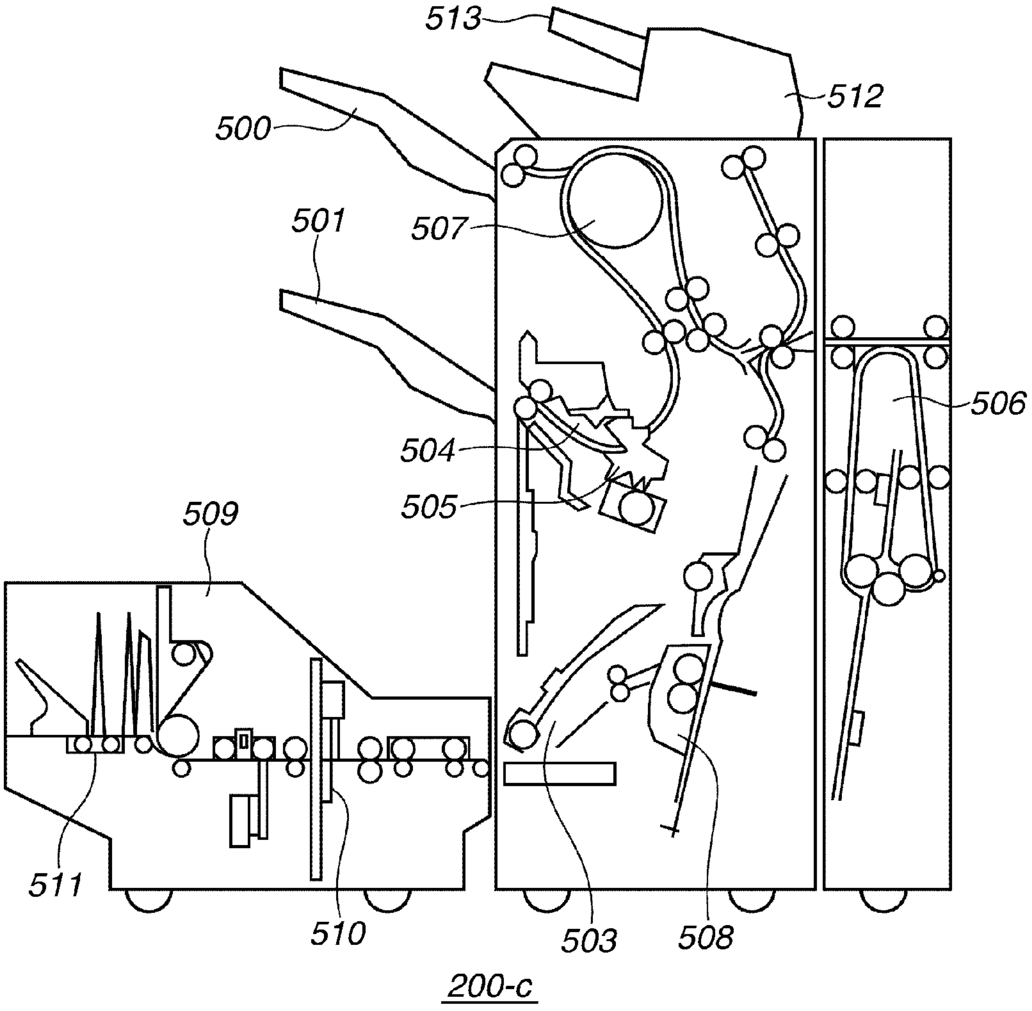
FIG. 5 is a cross section illustrating an exemplary configuration of a saddle stitch binding machine.

Referring to FIG. 5, the saddle stitch binding machine 200-*c* includes various units provided for selectively performing stapling processing, cutting processing, punching processing, Z-folding processing (also referred to as "one-edge folding processing"), shift discharge processing, and saddle stitch binding processing on sheets fed from the printing apparatus 100.

Furthermore, the saddle stitch binding machine 200-*c* does not include a straight path that functions as a sheet conveyance path to a downstream apparatus. Accordingly, in connecting a plurality of sheet processing apparatuses 200 to the printing apparatus 100, the saddle stitch binding machine 200-*c* is connected as the last apparatus, as illustrated in FIG. 3.

In addition, the saddle stitch binding machine 200-*c* includes a sample tray 500 and a stack tray 501 outside the saddle stitch binding machine 200-*c* and a booklet tray 503 inside the saddle stitch binding machine 200-*c*, as illustrated in FIG. 5.

When the control unit 205 receives an instruction for stapling with the saddle stitch binding machine 200-*c*, the control unit 205 allows sheets printed with the printing apparatus 100 to be serially stacked into a processing tray 504 inside the saddle stitch binding machine 200-*c*. After the sheets for one sheet stack are stacked on the processing tray 504, the control unit 205 performs stapling with a stapler 505. Then, the control unit 205 discharges the stapled sheet stack from the processing tray 504 to the stack tray 501 (FIG. 5).

In performing a job in which Z-folding is instructed to be performed with the saddle stitch binding machine 200-*c*, the control unit 205 performs processing for folding the sheet printed with the printing apparatus 100 in a Z-like shape with a Z-folding unit 506. Then, the control unit 205 allows the folded sheet to pass through the saddle stitch binding machine 200-*c* and to be discharged onto a discharge tray, such as the stack tray 501 or the sample tray 500.

When the control unit 205 is instructed to perform punching processing with the saddle stitch binding machine 200-*c*, the control unit 205 performs punching processing on the sheet printed with the printing apparatus 100 with a puncher unit 507. Then, the control unit 205 allows the sheet to pass through the saddle stitch binding machine 200-*c* and to be discharged onto a discharge tray, such as the stack tray 501 or the sample tray 500.

In performing a job in which saddle stitch binding is instructed to be performed with the saddle stitch binding machine 200-*c*, the control unit 205 performs binding at two positions in a central portion of the sheet stack including a plurality of sheets for one set with a saddle stitcher unit 508. After that, the control unit 205 performs two-folding using the central portion of the sheet stack as a reference by engaging the central portion of the sheet stack with a roller. Thus, a leaflet-like booklet can be produced. The sheet stack on which the saddle stitch binding processing has been performed with the saddle stitcher unit 508 is conveyed to the booklet tray 503.

When the control unit 205 receives an instruction for performing cutting processing on the job in which saddle stitch binding processing is instructed to be performed, the control unit 205 conveys the saddle stitch-bound sheet stack from the booklet tray 503 to a trimmer 509. Subsequently, the control unit 205 cuts the sheet stack conveyed to the trimmer 509 with a cutter unit 510 and holds the sheet stack in a booklet holding unit 511. The saddle stitch binding machine 200-*c* (FIG. 5) can also perform the three-side trimming of the saddle stitch-bound sheet stack.

When the saddle stitch binding machine 200-*c* does not include a trimmer 509, the sheet stack bound with the saddle stitcher unit 508 can be taken out of the booklet tray 503.

Furthermore, the saddle stitch binding machine 200-*c* can add a sheet set on an inserter tray 513 of an inserter 512

(FIG. 5) (for example, a previously printed cover sheet) to the sheet printed with and conveyed from the printing apparatus 100.

In addition, the saddle stitch binding machine 200-*c* not only processes the sheet conveyed from an upstream apparatus but also executes stapling, cutting, punching, Z-folding, shift discharge processing, and saddle stitch binding on the sheet fed from the paper feed unit of the saddle stitch binding machine 200-*c*. However, in the example illustrated in FIG. 5, the saddle stitch binding machine 200-*c* does not have a path for conveying the sheet fed by using the inserter 512 into the Z-folding unit 506.

Accordingly, Z-folding processing cannot be implemented by using the saddle stitch binding machine 200-*c* only. However, the saddle stitch binding machine 200-*c* can convey the sheet conveyed from an upstream apparatus to the Z-folding unit 506 (FIG. 5). Therefore, in the present exemplary embodiment, when a sheet is fed from an upstream sheet processing apparatus 200 by using an inserter thereof, the sheet can be processed by the Z-folding unit 506 (FIG. 5). As described above, the present exemplary embodiment can execute sheet processing only without using the printing apparatus 100.

The saddle stitch binding machine 200-*c* includes a sensor for determining whether a sheet has been set on the inserter tray 513 of the inserter 512. The saddle stitch binding machine 200-*c* transmits a result of the determination of presence of a sheet by the sensor to the control unit 205 via a signal line (not illustrated). Accordingly, the control unit 205 can determine whether a sheet has been set on the inserter tray 513.

Figure 6:
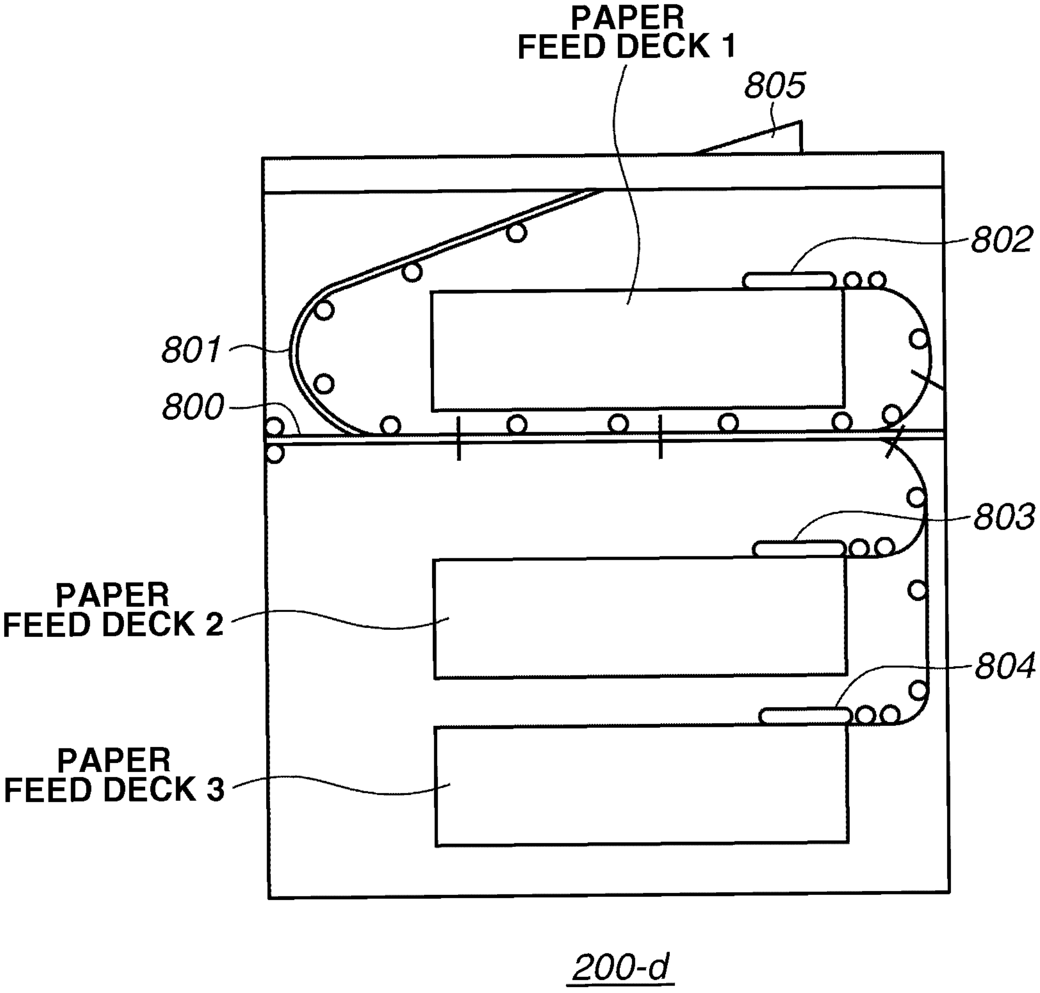
FIG. 6 is a cross section illustrating an exemplary configuration of a mass inserter.

Now, an exemplary configuration of the mass inserter 200-*d*, which can be applied in the sheet processing apparatus 200, will be described in detail below with reference to FIG. 6. FIG. 6 is a cross section illustrating an exemplary configuration of the mass inserter 200-*d*.

Referring to FIG. 6, the mass inserter 200-*d* conveys a sheet conveyed from an upstream sheet processing apparatus 200 to a downstream apparatus via a straight path 800. In addition, the mass inserter 200-*d* feeds a sheet from each paper feed stage (each of paper feed decks 1 through 3 illustrated in FIG. 6) by using a respective one of paper feed motors 802 through 804. Furthermore, the mass inserter 200-*d* conveys the fed sheet to a downstream apparatus via the straight path 800.

Furthermore, each of paper feed decks 1 through 3 includes a sensor for determining whether a sheet is present therein. Each of paper feed decks 1 through 3 notifies a result of the determination to the control unit 205. Thus, the control unit 205 can determine whether a sheet is set in each paper feed stage (the paper feed decks 1 through 3). An escape path 801 is a sheet conveyance path for discharging a sheet onto an escape tray 805.

An exemplary configuration of the operation unit 204 will now be described below with reference to FIG. 7.

Figure 7:
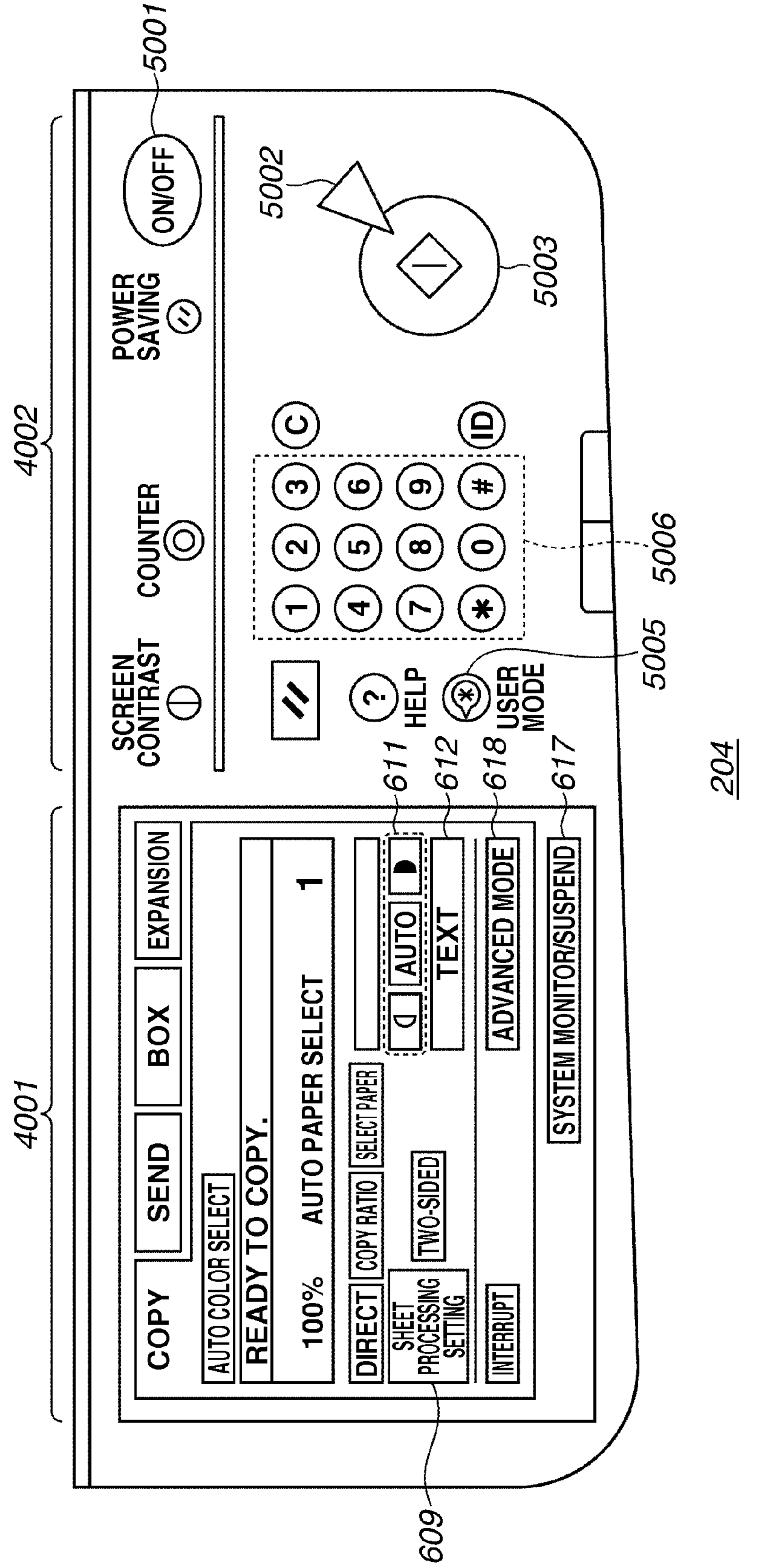
FIG. 7 illustrates an exemplary configuration of an operation unit.

Referring to FIG. 7, the operation unit 204 includes a touch panel portion 4001 and a key input portion 4002. The touch panel portion 4001 includes a liquid crystal display (LCD) and a transparent electrode attached on the LCD, and displays various setting screens used for receiving an instruction from the user. The touch panel portion 4001 not only functions to display various setting screens but also functions to receive an instruction from the user.

The key input portion 4002 includes a power key 5001, a start key 5003, a stop key 5002, a user mode key 5005, and a numeric keypad 5006. The start key 5003 is used for starting a copy job or a sending job with the printing apparatus 100.

The numeric keypad 5006 is used in performing a setting for entering numerical values, such as the number of copies to print. The user mode key 5005 is used for executing various settings for the apparatus.

The control unit 205 controls the printing system 1000 so that the printing system 1000 performs various types of processing according to a user instruction received via various screens displayed on the touch panel portion 4001 and a user instruction received via the key input portion 4002.

With the above-described configuration, the printing apparatus 100 executes an inline job, in which the sheet processing apparatus 200 executes post-processing on the sheet printed by the printing apparatus 100, according to an instruction from the user. Furthermore, the printing apparatus 100 having the above-described configuration executes an offline job, in which the sheet processing apparatus 200 executes post-processing on a sheet without executing printing on the printing apparatus 100, according to an instruction from the user.

Figure 8:
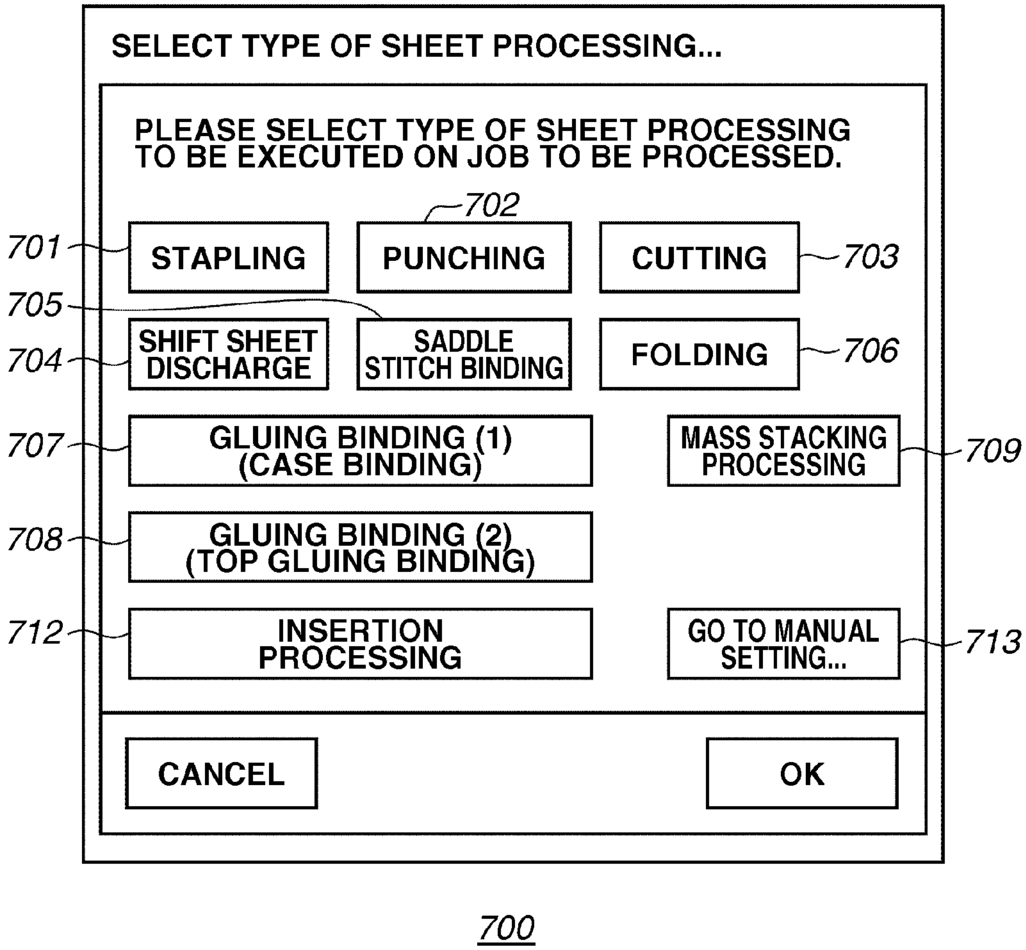
FIG. 8 illustrates an example of a user interface (UI), which is displayed on a touch panel portion.

FIG. 8 illustrates an example of a UI (user interface) screen (setting screen 700) displayed on the touch panel portion 4001 illustrated in FIG. 7. More specifically, FIG. 8 illustrates an example of the setting screen 700, which is used for allowing the user to select a type of sheet processing performed on a sheet printed with the printing apparatus 100 (FIG. 1).

Referring to FIG. 8, the control unit 205 displays the setting screen 700 illustrated in FIG. 8 on the touch panel portion 4001 when a sheet processing setting key 609 (FIG. 7) in the screen displayed on the touch panel portion 4001 is pressed by the user.

The setting screen 700 illustrated in FIG. 8 is a setting screen configured so that the user can select a type of sheet processing that can be performed with the sheet processing apparatus 200 in the printing system 1000.

More specifically, via the setting screen 700, the user can execute a setting for performing various types of processing, such as stapling processing 701, punching processing 702, cutting processing 703, shift discharge processing 704, saddle stitch binding processing 705, folding processing 706, gluing bookbinding processing 707, gluing bookbinding processing 708, mass stacking processing 709, and insertion processing 712.

In addition, the control unit 205 receives a setting of the sheet processing to be executed in the job to be processed via the setting screen 700 illustrated in FIG. 8. In addition, the control unit 205 executes control for performing the sheet processing with the sheet processing apparatus 200 according to the setting set by the user.

The setting set via the setting screen 700 is enabled when an inline job is executed. The setting can be set by performing the following operations. More specifically, the user sets the type of post-processing for the inline job to be executed via the setting screen 700. The user can execute a setting so that the insertion processing 712 is executed as a setting for an inline job.

The "insertion processing" 712 refers to processing for inserting a sheet fed from the inserter 200-*d* or a sheet fed from the inserter of the gluing bookbinding machine 200-*b* or the saddle stitch binding machine 200-*c* into a location of a stack of sheets printed by the printing apparatus 100.

In executing a setting for performing the insertion processing 712, the user sets the location of insertion of the sheet to be inserted and a paper feed source, which is a source of feeding the sheet to be inserted. The control unit 205, feeds a sheet from the paper feed source set by the user to insert the sheet into the sheet stack at the set location according to the content of the user setting.

For the paper feed source, the user can set either one of the paper feed decks 1 through 3 of the mass inserter 200-*d* or the inserter of the gluing bookbinding machine 200-*b* or the saddle stitch binding machine 200-*c*.

The control unit 205 stores the paper feed source set by the user on the HDD 209. In executing an offline post-processing job, the control unit 205 feeds a sheet from the designated paper feed source and executes post-processing of the designated type on the fed sheet.

The location of inserting a sheet can be set based on the number of sheets to be printed. It is also useful if the location of inserting a sheet is set based on the number of pages of image data to be printed. If the location of inserting a sheet is set based on the number of sheets to be printed, the user sets after which sheet the sheet is to be inserted. On the other hand, if the location of inserting a sheet is set based on the number of pages of image data to be printed, the user sets after which page the sheet is to be inserted.

Now, an example of an offline post-processing job setting screen, which is a setting screen for a job for executing sheet processing with the sheet processing apparatus 200 without executing printing by the printing apparatus 100, will be described in detail below with reference to FIG. 9.

Figure 9:
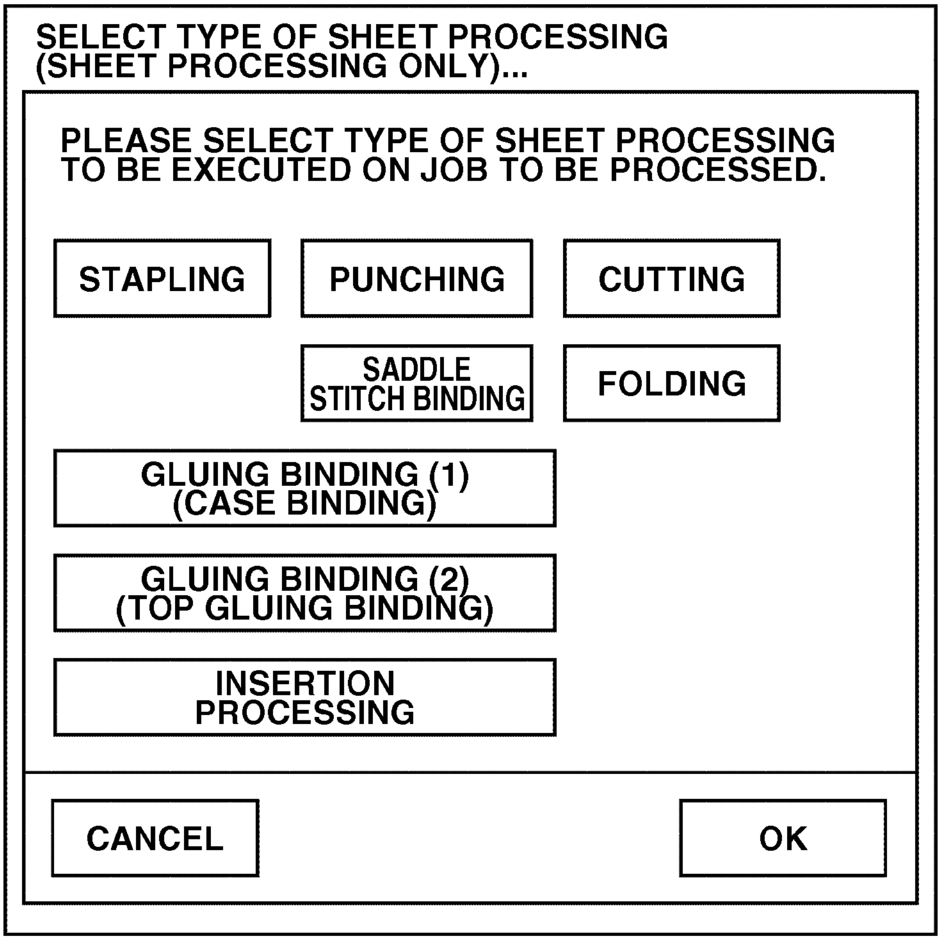
FIG. 9 illustrates an example of a UI, which is displayed on the touch panel portion.

FIG. 9 illustrates an example of a user interface displayed on the touch panel portion 4001 illustrated in FIG. 7. More specifically, FIG. 9 illustrates an example of a setting screen that allows the user to select the type of post-processing to be executed without performing printing by the printing apparatus 100. In the present exemplary embodiment, the "post-processing to be executed without performing printing by the printing apparatus 100" refers to post-processing executed on the sheet fed from the mass inserter 200-*d* or the sheet fed from the inserter of the gluing bookbinding machine 200-*b* or the saddle stitch binding machine 200-*c*.

When the user presses the manual setting key 713 (FIG. 8) via the screen illustrated in FIG. 9, which is displayed on the touch panel portion 4001, the control unit 205 displays the setting screen illustrated in FIG. 9 on the touch panel portion 4001. The setting screen illustrated in FIG. 9 according to the present exemplary embodiment is a setting screen that allows the user to select the type of sheet processing that can be executed as an offline post-processing job by using the sheet processing apparatus 200 of the printing system 1000.

More specifically, the user can execute a setting for performing various types of post-processing, such as stapling processing, punching processing, cutting processing, saddle stitch binding processing, folding processing, gluing binding processing, mass stacking processing, and insertion processing.

Compared with the display screen 700 illustrated in FIG. 8, the user cannot select shift discharge processing or mass stacking processing, which cannot be executed according to the configuration, via the setting screen illustrated in FIG. 9. This is because the sheet fed from the mass inserter 200-*d* cannot be conveyed to the apparatus that executes shift discharge processing or mass stacking processing since the apparatus that executes shift discharge processing or mass stacking processing is provided upstream of the mass inserter 200-*d*.

As described above, the control unit 205 executes control to allow the user to appropriately select the desired processing. The executed control appropriately displays the processing that can be selected when an inline job is to be executed on the setting screen 700 illustrated in FIG. 8. In addition, the executed control appropriately displays the processing that can be selected when an offline post-processing job is to be executed on the setting screen illustrated in FIG. 9.

To execute the display illustrated in FIG. 8 or FIG. 9, the control unit 205 acquires a configuration of the sheet processing apparatus 200, which is connected to the printing apparatus 100, and stores the acquired information about the configuration of the sheet processing apparatus 200 on the memory such as the RAM 208.

Thus, the control unit 205 can determine the presence of each sheet processing apparatus and appropriately execute the display illustrated in FIGS. 8 and 9. In addition, the control unit 205 also stores information about the order of connecting the sheet processing apparatuses 200. Accordingly, the control unit 205 executes control for disabling a key corresponding to processing that cannot be selected on the setting screen illustrated in FIG. 9.

It is useful if the control unit 205 acquires information about the configurations of and the order of connection of the sheet processing apparatuses 200 based on a signal transmitted from the sheet processing apparatuses 200 when the printing system 1000 is activated. It is also useful if the control unit 205 executes control for allowing the operator to register information for identifying the type, the order, and the number of the connected sheet processing apparatuses 200.

In addition, when the user sets the type of post-processing to be executed as an offline job, the user also sets the paper feed source of the sheet to be subjected to the designated post-processing. More specifically, the user can set as the paper feed source any one of the paper feed decks 1 through 3 of the mass inserter 200-*d* or the inserter of the gluing bookbinding machine 200-*b* or the saddle stitch binding machine 200-*c*.

The control unit 205 stores the paper feed source set by the user on the HDD 209. In executing an offline post-processing job, the control unit 205 feeds a sheet from the designated paper feed source and executes post-processing of the designated type on the fed sheet.

The printing system 1000 can store data of a plurality of jobs on the HDD 209. The control unit 205 appropriately loads and executes a job from the HDD 209.

As described above, the control unit 205 according to the present exemplary embodiment executes the above-described post-processing. However, the present exemplary embodiment is not limited to these. More specifically, any type of post-processing can be used as the post-processing executed by the control unit 205 according to the present exemplary embodiment as the post-processing that can be executed without particularly executing printing by the printing apparatus 100.

In the present exemplary embodiment, the control unit 205 can selectively execute either one of all the plurality of types of post-processing. However, the present exemplary embodiment is not limited to this. More specifically, the present invention can include a configuration in which only one type of post-processing can be executed without particularly performing printing by the printing apparatus 100.

In addition, in the present exemplary embodiment, when a request for executing an offline job is received from the operator, the control unit 205 executes control for feeding a sheet from a stack of sheets set in the paper feed source to a post-processing unit. The post-processing unit is provided within the sheet processing apparatus 200 and the feeding of the sheet is done without causing the sheet to go through the printing apparatus 100. Then, the control unit 205 executes control for performing the post-processing on the fed sheet by using the post-processing unit.

In the above-described manner, the control unit 205 enables execution of the post-processing designated by the user for the offline job by using the sheet processing apparatus 200 without executing printing by the printing apparatus 100.

In performing an offline job, it is also useful if a sheet to be utilized in the offline job is fed from a paper feed cassette included in the printing apparatus 100. In this case, the sheet is guided into the sheet processing apparatus 200 via a conveyance path provided within the printing apparatus 100 but the control unit 205 executes control for not executing printing by the printing apparatus 100 on the sheet fed in the above-described manner.

In addition, in this case, it is also useful if the user is allowed to select sheet processing, such as shift discharge processing or mass stacking processing, via the above-described setting screen illustrated in FIG. 9 because the paper feed source of the sheet is provided upstream of the large-capacity stacker 200-*a*. Furthermore, in this case, it is also useful, when the sheet is conveyed to the sheet processing apparatus 200, if the control unit 205 executes control for performing the post-processing designated by the user on a printed product thereof.

With the above-described configuration, the user can cause the printing system 1000 to execute an offline job by giving a request for starting the execution of the offline job by pressing the start key 5003 (FIG. 7) after completely executing settings for the offline job via the setting screen illustrated in FIG. 9.

The user can designate execution of binding processing and stapling processing on a printed sheet by using the printed sheet as the sheet to be fed in the offline job. However, suppose, after executing the settings for the offline job and the user has set the sheet on the paper feed unit (paper feed deck 1), which is the paper feed source of the offline job, that an inline job stored on the HDD 209 is executed.

Furthermore, suppose that it has been designated by the user to execute insertion processing for the inline job and that the user has set the paper feed deck 1 as the paper feed source (paper feed unit) used for the insertion processing.

In this case, if the inline job is executed, then the sheet set by the user to be used for the offline job may erroneously be used for the inline job, in which case a printed product not desired by the user may be output. In the present exemplary embodiment, the control unit 205 implements a method for preventing the sheet set for an offline job from being used in an inline job.

Figure 10:
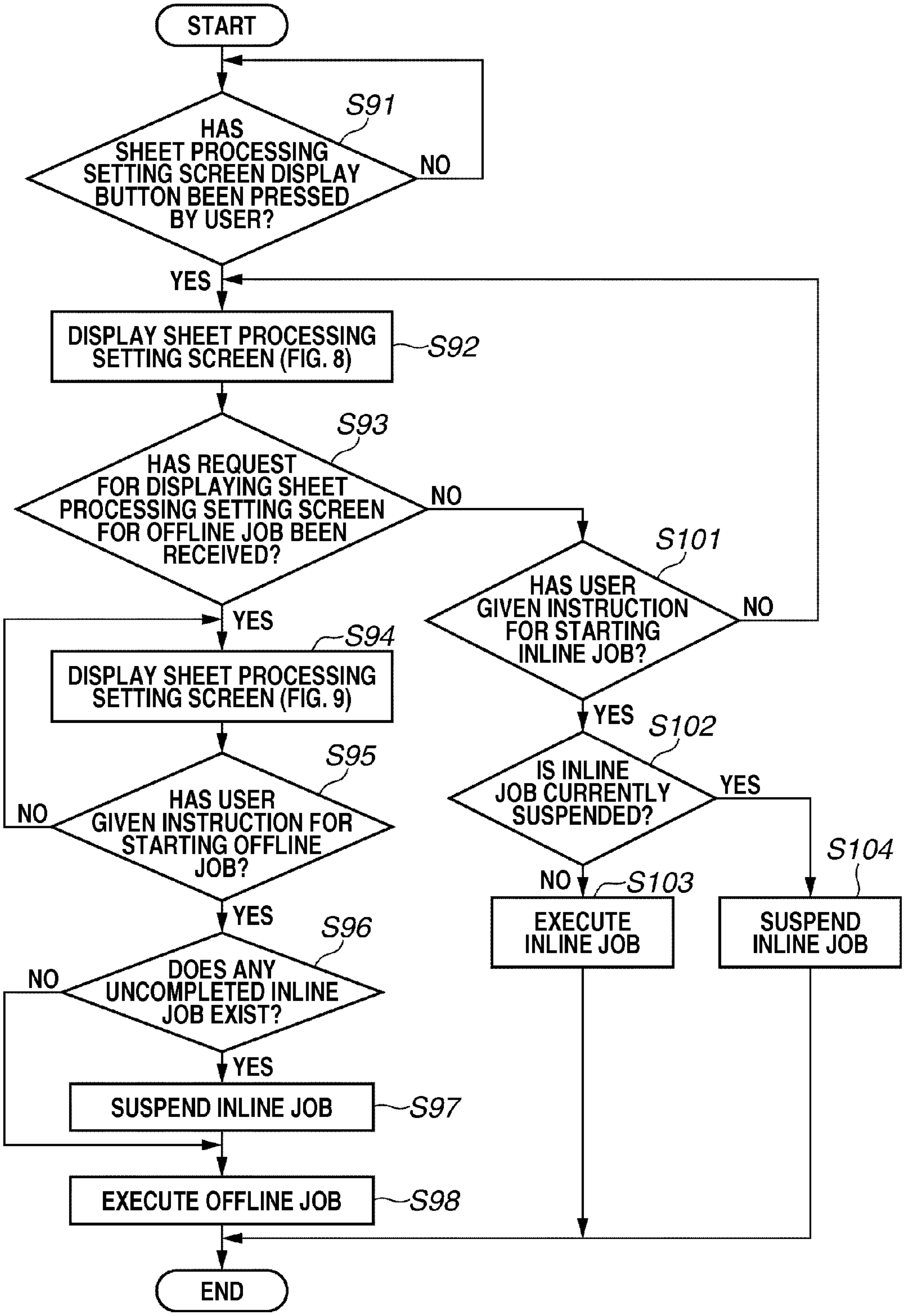
FIG. 10 is a flow chart illustrating an exemplary flow of processing executed by an image processing apparatus according to an exemplary embodiment of the present invention.

FIG. 10 is a flow chart illustrating an example of a flow of control processing executed by the printing apparatus 100 according to the present exemplary embodiment. In the present exemplary embodiment, the control unit 205 of the sheet processing apparatus 200 executes control for implementing processing and an operation of each step in the flow chart illustrated in FIG. 10 on the printing apparatus 100.

In addition, program codes for executing the processing in the flow chart illustrated in FIG. 10 on the printing apparatus 100 are previously stored on the ROM 207 of the printing apparatus 100 as program data. The control unit 205 loads and executes the program from the ROM 207 to cause the printing apparatus 100 to execute various exemplary processing and operations illustrated in FIG. 10.

Referring to FIG. 10, in step S91, the control unit 205 determines whether the sheet processing setting key 609 (FIG. 7) has been pressed by the operator via the screen displayed on the touch panel portion 4001. If it is determined that the operator has pressed the sheet processing setting key 609 (YES in step S91), then the processing advances to step S92.

In step S92, the control unit 205 executes control for displaying the sheet processing setting screen 700 (FIG. 8) on the touch panel portion 4001. In step S93, the control unit 205 determines whether a request has been received for displaying the sheet processing setting screen 700 for an offline job, for which post-processing is to be executed by using the sheet processing apparatus 200 without executing printing by the printing apparatus 100.

More specifically, in step S93, the control unit 205 determines whether the manual setting key 713 (FIG. 8) has been pressed. If it is determined that a request for displaying the sheet processing setting screen 700 for an offline job has been received (YES in step S93), then the processing advances to step S94. On the other hand, if it is determined that no request for displaying the sheet processing setting screen 700 for an offline job has been received (NO in step S93), then the processing advances to step S101.

In step S94, the control unit 205 executes control for displaying the setting screen illustrated in FIG. 9 on the touch panel portion 4001. The user executes a setting for the sheet processing to be executed via the setting screen illustrated in FIG. 9. More specifically, the user sets the type of the offline job and the paper feed unit, which is used as the paper feed source of the offline job. Furthermore, the user sets a sheet to be used in the offline job on the paper feed unit set as the paper feed source. Then, the user presses the start key 5003 to give an instruction for starting the designated sheet processing.

In step S95, the control unit 205 determines whether the user has given an instruction for starting the designated sheet processing. If it is determined that the user has given an instruction for starting the designated sheet processing (YES in step S95), then the processing advances to step S96. In step S96, the control unit 205 determines whether any uncompleted inline job remains.

In the present exemplary embodiment, an "uncompleted inline job" refers to a job whose print processing has already started within the printing system 1000 or a job waiting for its printing to be started.

If it is determined that no uncompleted inline job remains (NO in step S96), then the processing advances to step S98. In step S98, the control unit 205 controls the printing system 1000 so that each sheet processing apparatus 200 executes the designated sheet processing according to the setting for the post-processing set by the user.

On the other hand, if it is determined that an uncompleted inline job remains (YES in step S96), then the processing advances to step S97. In step S97, the control unit 205 controls the printing system 1000 to execute processing for suspending the uncompleted job.

In the present exemplary embodiment, the "processing for suspending a job" refers to processing for temporarily discontinuing the execution of the corresponding job. More specifically, in suspending a job, the control unit 205 saves the currently executed job on a save area of a storage unit such as the HDD 209. The control unit 205 can execute another job while the job is suspended. Execution of the suspended job can be resumed after the offline job is completed.

It is also useful if the execution of the suspended job is resumed according to a user instruction for resuming the inline job. More specifically, in this case, the control unit 205 executes control for suspending the printing of a job currently printed by the printing system 1000 and for not printing a job that has been waiting for the start of its printing.

However, if stapling by the saddle stitch binding machine 200-*c* and case binding by the gluing bookbinding machine 200-*b* have been set for a currently printed job, the printing of the job cannot be suspended during processing of a sheet stack to be bound. Accordingly, in this case, the control unit 205 controls the printing system 1000 so that the printing of the job is suspended at a point of time between sheet stacks.

In addition, the printing system 1000 can receive a job from the client PC 104 on the network via the external I/F 202 (FIG. 3) while the printing of a job is suspended.

In this case, the control unit 205 executes control of the printing apparatus 100 for storing the job received from the client PC 104 on the network on the HDD 209 and executing compression/decompression processing by using the compression/decompression unit 210.

After having suspended the inline job in step S97, the processing advances to step S98. In step S98, the control unit 205 executes post-processing by using the sheet processing apparatus 200 according to the setting for the post-processing set by the user.

On the other hand, if it is determined that no request for displaying the sheet processing setting screen 700 for an offline job has been received (NO in step S93), then in step S101, the control unit 205 determines whether a user instruction for starting the inline job has been received. If it is determined that a user instruction for starting the inline job has been received (YES in step S101), then the processing advances to step S102.

In step S102, the control unit 205 determines whether inline job suspension processing has been executed. If it is determined that the inline job has not been suspended yet (NO in step S102), then the processing advances to step S103. In step S103, the control unit 205 executes the inline job.

On the other hand, if it is determined that the inline job has been suspended (YES in step S102), then the processing advances to step S104. In step S104, the control unit 205 suspends the inline job and waits until the offline job is completely executed.

Now, processing to be executed after an offline job is completely executed will be described in detail below with reference to FIG. 11.

Figure 11:
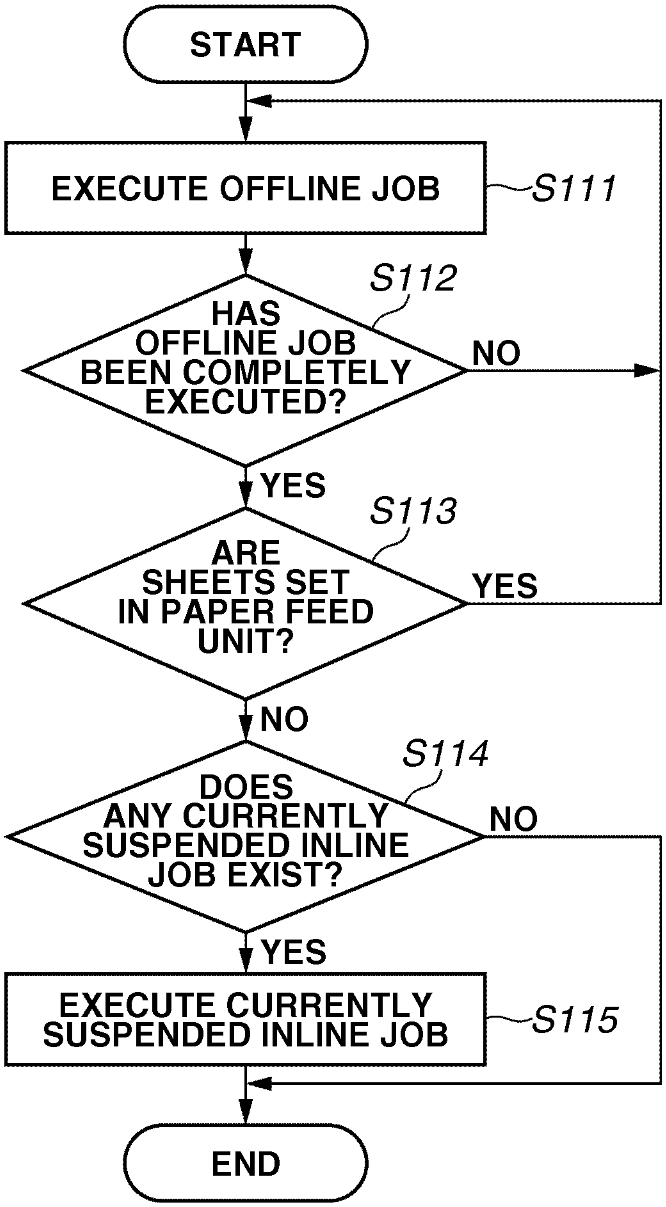
FIG. 11 is a flow chart illustrating an exemplary flow of processing executed by the image processing apparatus according to an exemplary embodiment of the present invention.

FIG. 11 is a flow chart illustrating an example of a flow of control processing executed by the printing apparatus 100 according to the present exemplary embodiment. In the present exemplary embodiment, the control unit 205 of the sheet processing apparatus 200 executes control for implementing processing and an operation of each step in the flow chart illustrated in FIG. 11 on the printing apparatus 100.

In addition, program codes for executing the processing in the flow chart illustrated in FIG. 11 on the printing apparatus 100 are previously stored on the ROM 207 of the printing apparatus 100 as program data. The control unit 205 loads and executes the program from the ROM 207 to cause the printing apparatus 100 to execute various exemplary processing and operations illustrated in FIG. 11.

After executing the offline job in step S98 in the flow chart of FIG. 10, the control unit 205 executes processing illustrated in FIG. 11.

Referring to FIG. 11, in steps S111 and S112, the control unit 205 continues the execution of the offline job until the offline job is completed. More specifically, in step S112, the control unit 205 determines whether the execution of the offline job has been completed. If it is determined that the execution of the offline job has been completed (YES in step S112), then the processing advances to step S113.

In step S113, the control unit 205 determines whether a sheet has been set in the paper feed unit designated as the paper feed source of the offline job (in the present exemplary embodiment, the paper feed deck 2 of the mass inserter 200-*d* is used as the paper feed unit) based on an output from the sensor of the paper feed deck 2.

If it is determined that a sheet has been set in the paper feed deck 2 (YES in step S113), then the control unit 205 continues the suspension of the inline job. A reason for this is that it is likely that the user desires in this case to execute another offline job by using the sheet set in the paper feed deck 2.

Accordingly, in this case, the processing returns to step S111 and the control unit 205 waits until another job is completely executed. Furthermore, in this case, in step S111, the control unit 205 waits for a user instruction for starting the execution of another offline job and executes control for starting another offline job. As described above, if it is determined that a sheet is set in the paper feed deck 2, which is the paper feed source of the offline job thus set by the user, the control unit 205 continues the suspension of the inline job.

On the other hand, if it is determined that no sheet is set in the inserter 200-*d* (NO in step S113), then the processing advances to 114. In step S114, the control unit 205 determines whether a currently suspended inline job exists. Information describing the presence of a currently suspended inline job is stored in a table managed by the control unit 205 on the RAM 208.

If it is determined that a currently suspended inline job exists (YES in step S114), then the processing advances to step S115. In step S115, the control unit 205 executes control for resuming the inline job. On the other hand, if it is determined that no inline job has been currently suspended (NO in step S114), then the processing ends.

The present exemplary embodiment executes the above-described processing. Accordingly, the present exemplary embodiment can prevent the sheet set in the post-processing apparatus for an offline job from being erroneously used in an inline job.

In the above-described exemplary embodiment, if it is determined that an uncompleted inline job exists, the control unit 205 suspends the currently executed inline job in step S97 (FIG. 10). However, if execution of processing for inserting a sheet is not set as the setting for the inline job, the sheet set for an offline job is not used in the inline job.

Accordingly, in this case, the control unit 205 determines whether an inline job for which execution of sheet insertion processing has been set as its setting is included in inline jobs stored on the HDD 209. If an inline job includes a setting for executing sheet insertion processing, then the control unit 205 suspends the inline job, while if an inline job does not include a setting for executing sheet insertion processing, then the control unit 205 permits the execution of the inline job.

Accordingly, the present exemplary embodiment can execute the inline job that does not include a setting for executing sheet insertion processing without suspending the same during printing processing. Furthermore, after the inline job is completely executed, the control unit 205 executes the offline job.

If a plurality of inline jobs for which execution of sheet insertion processing has not been set exists, it is useful if the control unit 205 executes the offline job after executing the sheet insertion processing. Furthermore, if the paper feed unit set to be used in sheet insertion processing for an inline job is different from the paper feed unit set to be used in sheet insertion processing for an offline job, it is also useful if the control unit 205 executes the offline job.

Accordingly, it is also useful if the control unit 205 executes the following control. More specifically, if execution of sheet insertion processing has been set for the inline job stored on the HDD 209, the control unit 205 determines the paper feed source of the sheet to be inserted by the sheet insertion processing set for the inline job.

In addition, the control unit 205 suspends the inline job for which a setting has been set for using the same paper feed unit as the paper feed unit that is the paper feed source that has been set to be used in the sheet insertion processing for the offline job. On the other hand, the control unit 205 executes the inline job for which a setting has been set for using the same paper feed unit as the paper feed unit that is the paper feed source that has been set to be used in the sheet insertion processing for the offline job.

By executing the above-described control, the present exemplary embodiment can execute the inline job without suspending the same if the sheet to be used in the sheet insertion processing of an offline job is not used in an inline job.

In the above-described exemplary embodiment, the screen illustrated in each of FIGS. 8 and 9 is displayed on the operation unit 204 of the printing system 1000. However, the present exemplary embodiment is not limited to this. More specifically, the screen illustrated in each of FIGS. 8 and 9 is displayed on a display of the server PC 103 and a user instruction is received via the operation unit of the server PC 103.

In this case, it is useful if the server PC 103 transmits an inline job including a print setting and image data to the printing system 1000 according to a user instruction to cause the printing system 1000 to execute the inline job. It is also useful if the server PC 103 transmits an offline job including a print setting to the printing system 1000 to cause the printing system 1000 to execute the offline job.

Aspects of the present invention can also be realized by a computer of a system or apparatus (or devices such as a CPU or MPU) that reads out and executes a program recorded on a memory device to perform the functions of the above-described embodiment(s). Aspects of the present invention further can be realized by a method, the steps of which are performed by a computer of a system or apparatus by, for example, reading out and executing a program recorded on a memory device to perform the functions of the above-described embodiment(s). To realize aspects of the present invention, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-143131 filed Jun. 16, 2009, which is hereby incorporated by reference herein in its entirety.

What is claimed is:

1. A printing apparatus, comprising:

a printer configured to print an image on a first sheet;

a conveyance path configured to convey the first sheet on which the image has been printed;

a stapler configured to staple the first sheet conveyed via the conveyance path;

an inserter, provided between the printer and the stapler, configured to feed a second sheet via the conveyance path into the stapler;

a receiver configured to receive an offline job for stapling the second sheet without printing and then receive an inline job for printing the image on the first sheet and stapling the first sheet; and a controller configured to, in a case where the receiver has received the inline job before the stapling of the second sheet for the received offline job is completed:

(i) restrict printing the image on the first sheet for the received inline job;

(ii) determine whether the inserter has, in a case where the stapling for the received offline job is completed, another sheet on a sheet tray of the inserter that the inserter can feed via the conveyance path into the stapler;

(iii) continue the restriction of the printing for the received inline job in a case where the stapling for the received offline job has been completed and the inserter has the another sheet on the sheet tray of the inserter that the inserter can feed via the conveyance path into the stapler; and (iv) release the restriction of the printing for the received inline job to cause the printer to start the printing for the received inline job in a case where the stapling for the received offline job has been completed and the inserter has no sheet that the inserter can feed via the conveyance path into the stapler.

2. The printing apparatus according to claim 1, wherein the printer is configured to perform the printing for the received inline job, without any reception of further instruction from a user after the stapling for the received offline job is completed.

3. The printing apparatus according to claim 1, wherein the controller is configured to determine, after the stapling for the received offline job is completed, whether there is the restricted printing, and wherein the printer is configured to start the restricted printing when it is determined that there is the restricted printing.

4. The printing apparatus according to claim 1, further comprising a setting key configured to set a stapling process to be performed to one or more sheets and a start key to start the stapling process, and the start key operates to: (i) start the stapling process without the printing, or (ii) start the stapling process with the printing.

5. A control method for controlling a printing apparatus, the control method comprising:

printing, via a printer of the printing apparatus, an image on a first sheet;

conveying, via a conveyance path of the printing apparatus, the first sheet on which the image has been printed;

stapling, via a stapler of the printing apparatus, the first sheet conveyed via the conveyance path;

feeding, via an inserter of the printing apparatus where the inserter is located between the printer and the stapler, a second sheet via the conveyance path into the stapler;

receiving, via a receiver of the printing apparatus, an offline job for stapling the second sheet without printing and then receive an inline job for printing the image on the first sheet and stapling the first sheet; and via a controller of the printing apparatus, in a case where the receiver has received the inline job before the stapling of the second sheet for the received offline job is completed:

(i) restricting the printing of the image on the first sheet for the received inline job;

(ii) determining whether the inserter has, in a case where the stapling for the received offline job is completed, another sheet on a sheet tray of the inserter that the inserter can feed via the conveyance path into the stapler;

(iii) continue restricting the printing for the received inline job in a case where the stapling for the received offline job has been completed and the inserter has the another sheet on the sheet tray of the inserter that the inserter can feed via the conveyance path into the stapler; and (iv) releasing the restriction of the printing for the received inline job to cause the printer to start the printing for the received inline job in a case where the stapling for the received offline job has been completed and the inserter has no sheet that the inserter can feed via the conveyance path into the stapler.

6. The method according to claim 5, wherein the printing is performed for the received inline job without any reception of further instruction from a user after the stapling for the received offline job is completed.

7. The method according to claim 5, further comprising determining, via the controller, after the stapling for the received offline job is completed, whether there is the restricted printing, wherein the restricted printing is performed when it is determined that there is the restricted printing.

8. A non-transitory computer-readable storage medium storing a computer program causing a printing apparatus to perform a control method for controlling a printing apparatus, the control method comprising:

printing, via a printer of the printing apparatus, an image on a first sheet;

conveying, via a conveyance path of the printing apparatus, the first sheet on which the image has been printed;

stapling, via a stapler of the printing apparatus, the first sheet conveyed via the conveyance path;

feeding, via an inserter of the printing apparatus where the inserter is located between the printer and the stapler, a second sheet via the conveyance path into the stapler;

receiving, via a receiver of the printing apparatus, an offline job for stapling the second sheet without printing and then receive an inline job for printing the image on the first sheet and stapling the first sheet; and via a controller of the printing apparatus, in a case where the receiver has received the inline job before the stapling of the second sheet for the received offline job is completed:

(i) restricting the printing of the image on the first sheet for the received inline job;

(ii) determining whether the inserter has, in a case where the stapling for the received offline job is completed, another sheet on a sheet tray of the inserter that the inserter can feed via the conveyance path into the stapler;

(iii) continue restricting the printing for the received inline job in a case where the stapling for the received offline job has been completed and the inserter has the another sheet on the sheet tray of the inserter that the inserter can feed via the conveyance path into the stapler; and (iv) releasing the restriction of the printing for the received inline job to cause the printer to start the printing for the received inline job in a case where the stapling for the received offline job has been completed and the inserter has no sheet that the inserter can feed via the conveyance path into the stapler.

* * * * *